UNITED STATES PATENT OFFICE.

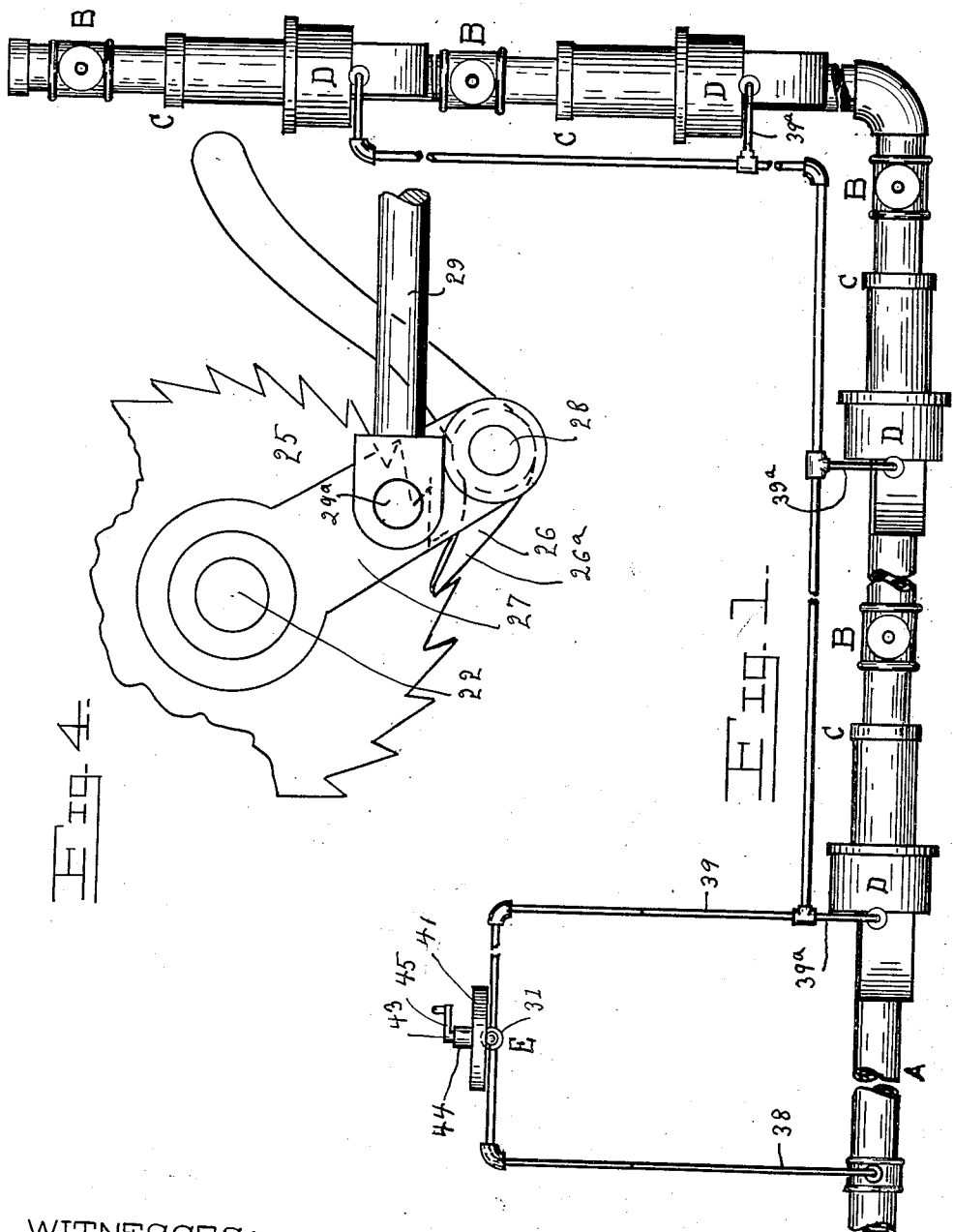

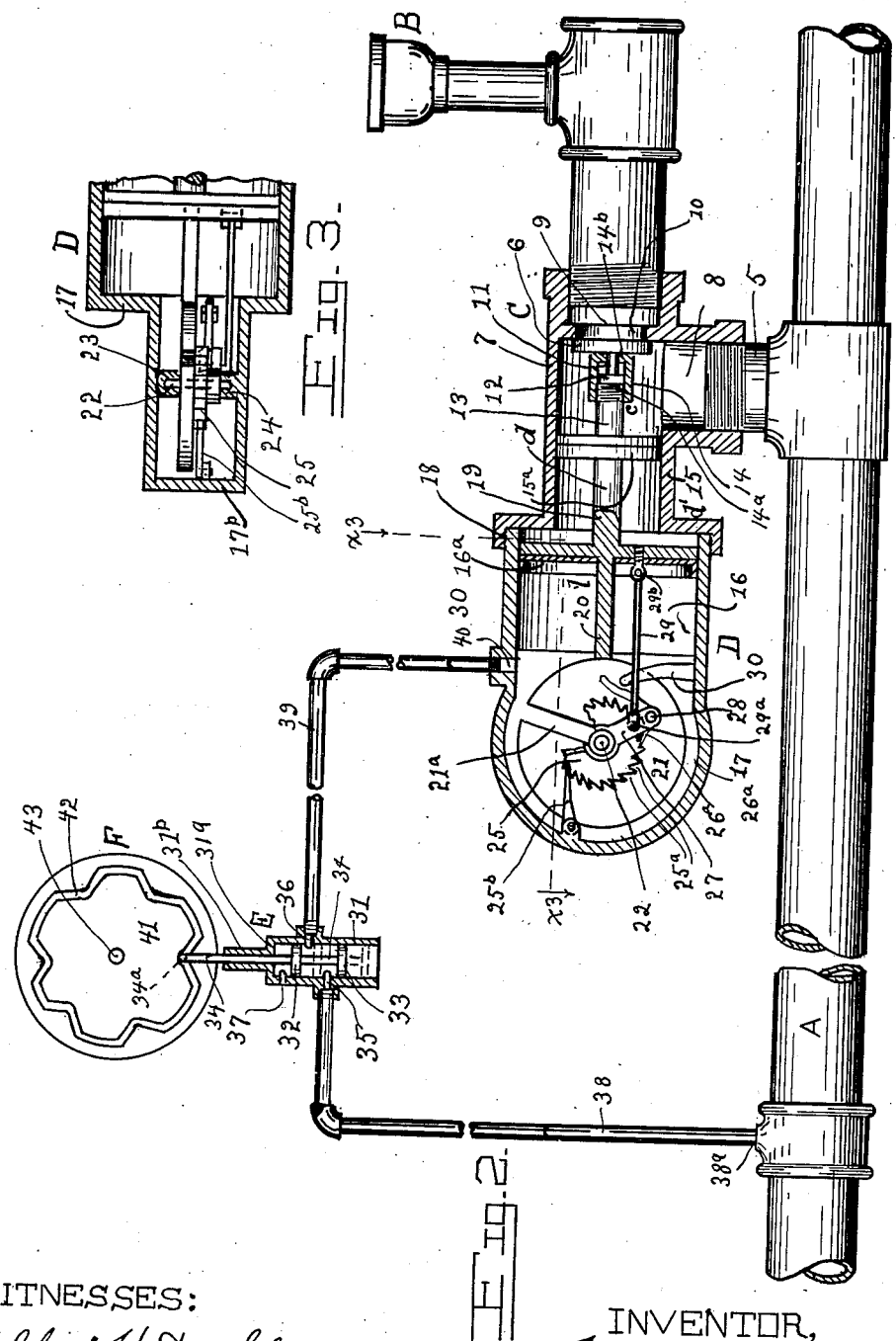

FREDERICK H. JOHNSON, OF SOUTH PASADENA, CALIFORNIA.

SYSTEM AND MEANS OF CONTROL.

1,258,013.   Specification of Letters Patent.   Patented Mar. 5, 1918.

Application filed April 15, 1916. Serial No. 91,421.

*To all whom it may concern:*

Be it known that I, FREDERICK H. JOHNSON, a citizen of the United States, residing at South Pasadena, in the county of Los Angeles and State of California, have invented new and useful Improvements in Systems and Means of Control, of which the following is a specification.

This invention relates to systems and means of control, and it has for its object to provide improvements of this general character which will be applicable to a wide variety of devices or mechanisms and whereby a plurality of the same may be controlled, with respect to operation, by means of a single controlling means unit which may be operated, if desired, mechanically, by only a small fraction of the power necessary to operate or set in operation the mechanism so controlled, and, in certain cases, the power required to operate such controlling unit may be furnished by pressure of a finger of the operator.

In another application for United States Patent, filed by me November 2, 1915, Serial Number 59,293, for systems and means for control, I have disclosed and claimed certain features herein disclosed, though in such other systems, a separate controlling device is employed for each operable device or mechanism of the system.

In accordance with the present invention a plurality of devices or mechanisms may be controlled as to operation, singly or plurally, from a suitable point of control and by means of a single controlling unit, without the necessity of providing separate connections extending from each controlled device all the way to the point of common control; but through the agency of a single means of connection branched for connection with the mechanisms of each operable device such operable devices may all be controlled and caused to successively or otherwise operate, in accordance with the desired or required predetermined adjustment of the system; furthermore, by the provision of simple actuating means for the single controlling unit, the period of operation of each device may be varied in accordance with predetermined requirements.

The system is shown as applied to operate a plurality of valves for controlling the flow of water in a sprinkling system, though many other useful applications of the invention will readily suggest themselves. In the application of the invention to the operation of lawn sprinklers and the like, fluid pressure for operating the valves controlling the flow from the water mains may be drawn from the mains and controlled through the single control unit, with respect to its application to valve operating means. In a system such as that being described, connection need only be made at one point with the water main to supply water under pressure to control the operating means and such water is led through the controlling unit and may be led through a single pipe which may parallel the mains to control all of the valve operating mechanisms, the only requirement being that connection be made between such pipe and each and all of the operating mechanisms.

A further object of the invention is to provide apparatus of the general character stated which will be relatively simple and inexpensive in construction and installation, not liable to get out of order or repair, which will be highly efficient, and which will be generally superior in point of reliability and serviceability.

With the above and other objects in view, the invention consists in the novel and useful provision, construction, combination, association and inter-relation of parts, members and features, all as hereinafter described, shown in the drawing, and finally pointed out in claims.

In the drawing:

Figure 1 is a fragmentary plan view of a system and means of control constructed and organized in accordance with the invention;

Fig. 2 is an enlarged fragmentary side elevation of a portion of a system shown in Fig. 1, parts being broken away and sectioned for clearness of illustration;

Fig. 3 is a detail sectional view taken on the line $x^3$—$x^3$, Fig. 2, and looking in the direction of the appended arrows; and Fig. 4 is a fragmentary side elevation of certain features shown in Figs. 2 and 3, the view being upon a still further enlarged scale.

Corresponding parts in all of the figures are designated by the same reference characters.

Referring with particularity to the drawing, in the embodiment of the invention therein shown A designates a water main which supplies a plurality of lawn sprinklers B, each of which is provided with valve means C for controlling the supply of water from the main to the respective sprinkler. Each of the valve means C is operated by means of its respective valve operating means D, controlling means E being provided whereby each and all of the devices may be controlled from any suitable point of control.

Each sprinkler B with its valve operating means D may be fed from the main A through suitable branch pipes 5, the valve means C controlling each sprinkler being arranged to control the passage of water through such branch pipe 5. The valve means may comprise a valve 6 provided in a valve casing 7 having a water inlet passage 8 and a water outlet passage 9 and provided with an apertured partition 10 forming a seat for the valve 6. A valve operating stem 11 is provided on the valve 6 and terminates in a head 12 forming one member of a means of connection $c$ between the valve and the operating mechanism D thereof. The other member of the means of connection $c$ preferably comprises a longitudinally movable stem 13 united with portions of the valve operating means D, and provided with a cylindrical member 14 which is threaded on to the end of the stem 13 as at $14^a$. The member 14 is turned inwardly at one end as at $14^b$ for engagement with the head 12 when the valve operating means is to unseat the valve 6. The valve 6 is normally held to its seat by the operating means, through the stem 13 the end of which abuts against the head 12. The connection $c$ thus provides a means of connection whereby the valve 6 may be unseated by the operating means D upon sufficient movement of the operating means to cause such unseating, but the valve 6 will be permitted to remain on its seat while the valve operating mechanism D, or portions thereof, executes a movement less than that required to cause the engagement of the inturned end $14^b$ of the member 14 with the head 12.

Each operating means D may comprise a differential piston device $d$, and a differential cylinder $d'$ therefor. The differential cylinder $d'$ is shown as formed in part integrally with the valve casing C, and comprises a cylnder portion 15 adjacent to and opening into the water inlet passage 8, and a cylinder portion 16 of greater internal diameter than the portion 15. The cylinder is closed by a head 17 integral with the cylinder portion 16 which is threaded into the portion 15 as at 18. The differential piston device $d$ comprises a piston $15^a$ fitted within the bore of the cylinder portion 15, a piston $16^a$ of greater diameter than piston $15^a$ and fitting the bore of the cylinder portion 16, and a rod 19 uniting the piston $15^a$ and the piston $16^a$. In the form of operating means illustrated, a tail rod 20 extends from the piston $16^a$ and is arranged to abut against a stop plate 21 when such stop plate is in position to block a complete full length stroke of the operating means. The stop plate 21 is fixedly mounted upon a transverse shaft 22 journaled in suitable bearings 23 and 24 provided on the cylinder head 17. The cylinder head 17 is shown as formed with a portion $17^b$ projecting therefrom and forming a housing in which the stop plate 21, and other features, are housed. A ratchet wheel 25 is secured to the shaft 22 near the stop plate 21 and is adapted to be operated by means of a pawl 26 taking into the teeth $25^a$ of the ratchet wheel. Rotatably mounted upon the shaft 22 is a pawl support 27 at the outer end of which the pawl 26 is pivotally mounted as at 28. A connecting rod 29 has one of its ends pivotally secured to the pawl supporting member 27 as at $29^a$, and has its other end pivotally secured to the piston $16^a$ as at $29^b$. The stop plate 21 is preferably circular and is cut away as at $21^a$ to provide a notch for the reception of the tail rod 20 when the stop plate is in position to permit the intrusion of the tail rod and allow a full length stroke to be made by the differential device $d$. The pawl 26 is provided with a finger portion $26^a$ adapted to engage the successively presented teeth $25^a$ of the ratchet wheel 25, and is provided with an extending cam portion arranged to contact with a pawl trip 30 which projects into the path of the cam portion of the pawl and is fixed to the cylinder head 17. $25^b$ is a ratchet wheel detent.

Controlling means E preferably comprises a cylinder 31, a piston 32, a piston 33, and a piston rod 34 connecting the pistons 32 and 33, extending from the cylinder to permit manipulation, operation or adjustment of the controlling means. The pistons 32 and 33 constitute a balanced piston-valve device. A water inlet port 35 is provided in the wall of the cylinder 31 and a water controlling port 36 is provided in the cylinder wall spaced longitudinally of the cylinder wall from the port 35 to permit the positioning of the piston 32 between such ports. A water discharge port or pressure relief port 37 is provided still farther away from the port 35 and in such position that the piston 32 normally lies between it and the port 36. The cylinder 31 is provided at one end with a head $31^a$ having a boss $31^b$ formed thereon which may act as a guide for the piston rod 34. The other end of the cylinder is shown as open. A relatively small pipe 38 is connected at one end with the water main A as at $38^a$ and is connected at the other end with the cylinder 31, communicating with the interior of the cylinder through the port 35. A pipe 39 has one end connected with the cylinder to communicate with the interior thereof through the port 36, and has the other end connected with the cylinder 16 of the operating means D, communicating with the interior of the cylinder 16 through the port 40 provided preferably in the cylinder head 17. Mechanical means of operation may be employed for the controlling means, and a convenient form is shown at F. A cam plate 41 has a groove 42 formed in one of its faces, and is secured to a short shaft 43 which is mounted for rotation in a suitable journal 44. The piston rod 34 may be provided with an overhanging portion 34ª taking into the cam groove 42. The cam groove 42 is formed so as to reciprocate a piston rod 34 when the shaft 43 with the attached cam plate is rotated, as by means of a crank 45. The groove 42 may be varied on the several segmental portions of the cam plate, so as to provide a longer dwell of the pistons 32 and 33 at the end of the one stroke than the dwell allowed on a preceding stroke. By this means, with a uniform rate of cam plate rotation, the operable devices may be operated, each for a time period different from the others in installations where it is desirable that one device shall operate for a longer period than other devices of the same system.

The operation, method of use and advantages of the improved system and means of control, will be readily understood from the foregoing disclosure, taken in connection with the accompanying drawings and the following statement.

Water under pressure being admitted to the space between the valves 6 and the pistons 15ª, and to the cylinders 16 of the operating means D, the valves 6 will be kept on their seats, due to the difference of area of the pistons 15ª and 16ª the controlling pistons 32 and 33 being in the position shown in Fig. 2. As long as the controlling pistons remain in the position shown in Fig. 2, the valves 6 will be held to their seats as the water pressure from the main will, through the pipe 38, the port 35, the cylinder 31, the port 36, the pipe 39, the branch pipes 39ª and the ports 40 act upon the differential piston devices to prevent the pressure from the main from forcing the pistons 15ª in such direction as to cause the withdrawal of the valves 6 from their seats. When, however, the pistons 32 and 33 of the controlling means E are moved to the position shown in dotted lines in Fig. 2, the pressure on the pistons 16ª of the differential devices is relieved and the water in the cylinders 16 may escape through the ports 40, the branch pipe 39ª, the pipe 39, the port 36, the cylinder 31, and the port 37. The pressure on the pistons 16ª being released, and the area of the pistons 15ª being greater than the area of the valves 6, the differential devices d will move in such direction as to withdraw the valves 6 from their seats and permit the escape of fluid from the main through the sprinklers B.

However, such differential piston devices as are blocked in their movements by their respective stop plates 21, through the respective tail rods 20, cannot move far enough in a valve opening direction to withdraw the respective valves 6 from their seats on account of the connecting means c which permits a slight reciprocation of the differential piston devices without valve disturbance.

When the stop plate 21 is in position to permit a full stroke to be taken by any particular differential piston or pistons d, as by presenting the notch 21ª to the respective tail rod the extreme limit of slippage allowed by the connecting means c will be reached and the respective valve or valves 6 drawn from their seats thereby permitting the escape of fluid from the main through the respective sprinkler or sprinklers B. Rotation of the stop plates 21 is caused by the oscillation of the respective pawl mechanisms, through the connecting rods 29 as the connecting means c all permit differential piston device strokes of sufficient length to rotate the stop plate 21 the distance provided for by one of the pawl teeth without disturbing the valves. The stops 30 acting upon the cam portions of the pawls determine the point in the pawl oscillation where the pawls are withdrawn from the ratchet teeth to prevent overrunning of the plates 21. It is evident that each pawl tooth should be proportioned to correspond with the distance through which the respective plate 21 is to be rotated at each differential piston device actuation. Upon restoration of the controlling devices 32 and 33 to normal position pressure is supplied to reseat all of the valves.

It will be understood that by providing as many pawl notches in each unit as there are units to be controlled in the system, and by properly proportioning the stop plates 21, each plate with its respective ratchet wheel may be spaced so that the notches 21ª throughout the system will be brought successively into registration with their respective tail rods and the result will be that the operable devices will be successively brought into play as their respective tail rods 20 and notches 21ª register due to successive impulses controlled by reciprocation of the balanced piston device of the controlling means E. Of course the operable devices may be otherwise set or adjusted and a plurality of the same may be simultaneously operated if desired.

With mechanism organized in accordance with the invention, a single operable device and operating means therefor may be controlled by means of the controlling unit and may be influenced by each actuation of the controller to drive its blocking mechanism which will prevent actuation of the operable device until a predetermined number of controller actuations have influenced the operating means.

Having thus disclosed my invention I claim and desire to secure by Letters Patent:

1. An improved system and means of control, comprising a plurality of separate operable devices, separate fluid pressure actuated operating means for said devices, and a fluid pressure controlling means for said operating means upon successive actuations of which the operating means may successively act; said operating means all being influenced by each actuation of said controlling means but not all of said operating means being permitted to act upon their respective operable devices simultaneously.

2. An improved system and means of control, comprising a plurality of separate operable devices, separate fluid pressure actuated operating means for said devices, a fluid pressure controlling means for said operating means upon successive actuations of which the operating means may successively act, and mechanism whereby certain of the operating means are prevented from acting upon the respective operable devices.

3. An improved system and means of control, comprising a plurality of separate operable devices, separate fluid pressure actuated operating means for said devices, and a fluid pressure controlling means for said operating means upon successive actuations of which the operating means may successively act; said operating means each comprising an operable device actuating element, and means at one time blocking said element to prevent operation of the operable device and at another time permitting movement of said element to operate said operable device.

4. An improved system and means of control, comprising a valve, means for operating said valve, a controlling means for said operating means adapted to be successively actuated to permit or block the actuation of said valve operating means, and a conduit communicating with said controlling means and with said valve operating means.

5. In a fluid controlling system, a valve to control the flow of fluid from a suitable source of fluid supply, fluid pressure actuated means for operating said valve, a controlling unit, and a conduit connected with a source of fluid supply and with said operating means and interrupted to receive a controller, and said controller; said controller being adapted for actuation to permit or prevent actuation of said valve operating means by successively actuating said controller.

6. An improved system and means of control, comprising an operable device, operating means for said device, a controlling means for said operating means by successive actuations of which said operating means may be controlled as to actuation or non-actuation, a means for connection between said controlling means and said operating means; said operating means comprising a device for actuating said operable device, and means subject to control by said controller for at times blocking the actuation of said operable device by said actuating device.

7. An improved system and means of control, comprising an operable device, operating means for said device, a controlling means for said operating means by successive actuations of which said operating means may be controlled as to actuation or non-actuation, and a means of connection between said controlling means and said operating means; said operating means comprising a device for actuating said operable device, and means subject to control by said controller for at times blocking the actuation of said operable device by said actuating device; said blocking means being actuated by movement of a portion of said operating means.

8. An improved system and means of control, comprising a plurality of separate operable devices, separate fluid pressure actuated operating means for said devices, and a fluid pressure controlling means for said operating means upon successive actuations of which all of the operating means may be caused to act in accordance with predetermined adjustment of the system; said controlling means being connected with all of said operating means; there being means to prevent the simultaneous operation of all of said operating means.

9. An improved system and means of control, comprising an operable device, fluid pressure actuated means for operating said device, a fluid pressure controlling means for said operating means upon successive actuations of which said operating means may be operated and prevented from operating, and blocking means for so permitting the operation or non-operation of said operating means; said blocking means consisting of a member which in certain positions prevents full actuation of said operating means and when in other positions permits full operation of said operating means.

10. An improved system and means of control, comprising a plurality of separate operable devices, separate fluid pressure actuated operating means for said devices, and a fluid pressure controlling means common to all of said operating means and upon successive actuations of which all of said operating means may be caused to act in predetermined sequence; all of said operating means being influenced at each actuation of said controlling means; there being means to prevent the actuation of all of said operating means simultaneously.

11. An improved system and means of control, comprising a plurality of separate operable devices, separate means for actuating said devices, and a controlling means for said operating means whereby the supply of energy to said operating means may be controlled; energy being supplied to all of said operating means simultaneously to cause the successive actuation of said operating means, but not all of said operating means being permitted to act upon their respective operable devices simultaneously.

In testimony whereof, I have signed my name to this specification in the presence of two subscribing witnesses.

FREDERICK H. JOHNSON.

Witnesses:
ALFRED H. DAEHLER,
JOHN F. POOLE.